No. 824,282. PATENTED JUNE 26, 1906.
H. CLIMER.
VINE DIVIDER ATTACHMENT.
APPLICATION FILED NOV. 6, 1905.
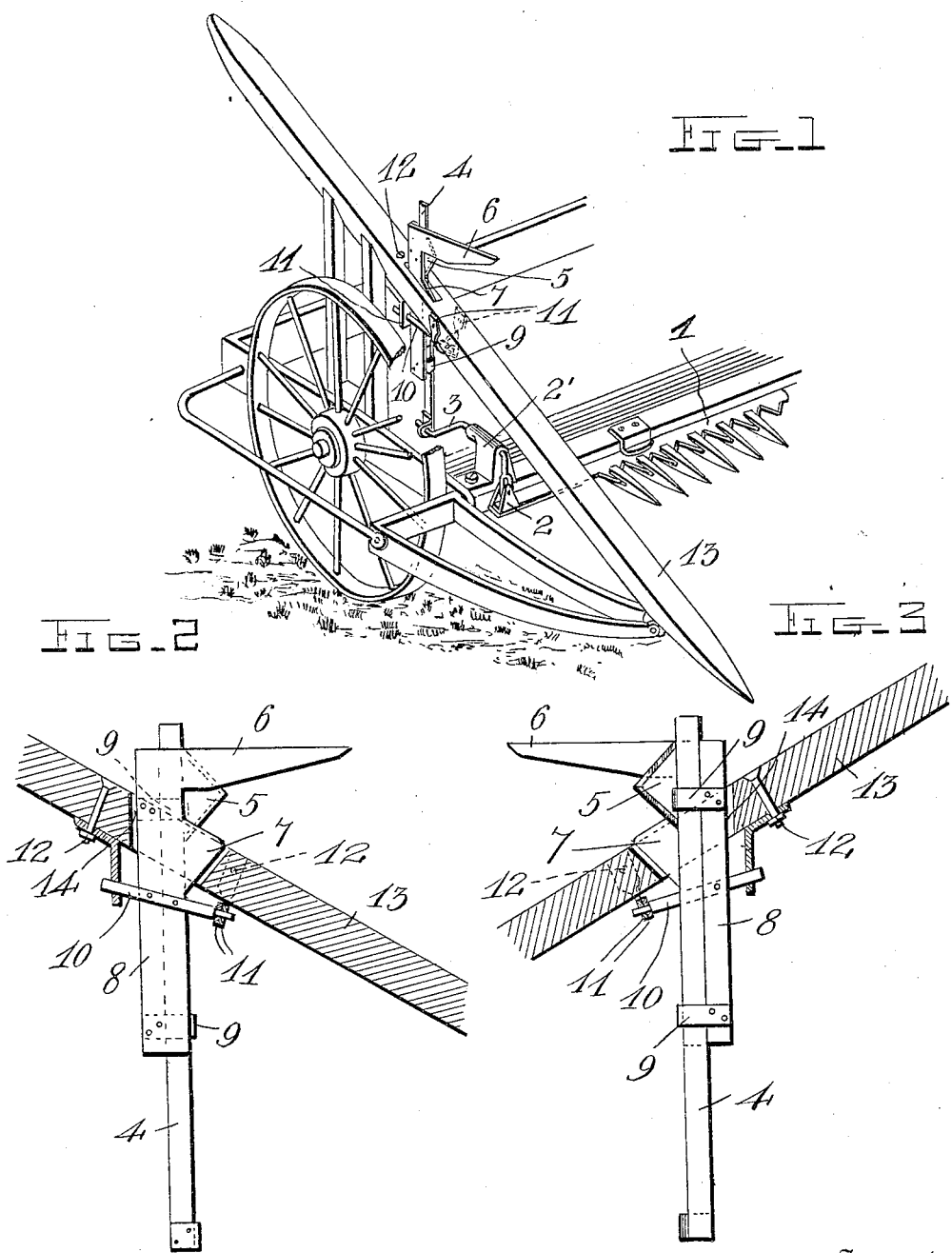
Witnesses
Inventor
Herschel Climer
by H. B. Wilson
Attorney

UNITED STATES PATENT OFFICE.

HERSCHEL CLIMER, OF CHILLICOTHE, OHIO.

VINE-DIVIDER ATTACHMENT.

No. 824,282. Specification of Letters Patent. Patented June 26, 1906.

Application filed November 6, 1905. Serial No. 286,120.

*To all whom it may concern:*

Be it known that I, HERSCHEL CLIMER, a citizen of the United States, residing at Chillicothe, in the county of Ross and State of Ohio, have invented certain new and useful Improvements in Vine-Divider Attachments; and I do declare the following to be a full, clear, and exact description of the invention, such as will enable others skilled in the art to which it appertains to make and use the same.

This invention relates to vine-dividers designed to be attached to the divider-board of a binder or harvester; and the principal object of the same is to provide a device that will prevent vines from riding up over the divider-board.

Another object is to provide means for cutting the vines at a point near where they start to ride up and over the divider-board.

Still another object is to provide a simple and efficient attachment for machines as at present constructed which will effectually prevent the tangling of grain as it is carried up and over the divider-board by means of vines which become entangled with the grain.

These and other objects are attained by means of the construction illustrated in the accompanying drawings, in which—

Figure 1 is a perspective view of a portion of a binder, showing the attachment in place thereon. Fig. 2 is a plan view of the attachment, and Fig. 3 is a similar view looking at the opposite side of the attachment.

Referring to the drawings for a more particular description of my invention, the numeral 1 designates the sickle-bar of a binder, to one end of which is connected a bracket 2, and connected to this bracket is a rod 3, bent to form a crank, the upper end of which is secured to a vertically-disposed reciprocating sickle-bar 4. The sickle-bar 4 carries a V-shaped cutter 5, which is adapted to be reciprocated between the two fingers 6 7, said fingers being formed on or connected to the guide 8, provided with guide-straps 9. Connected to the guide is a cross-bar 10, and fitted to said cross-bar are brackets 11, of suitable form to be bolted at 12 to the under side of the divider-board 13 at its opposite ends. The guides and sickle-bar extend through an opening 14 in the divider-board.

The operation of my invention may be described as follows: As the horizontal sickle-bar of the binder is operated the crank attached to the end thereof reciprocates the vertically-disposed cutter of my attachment, and thus vines that are carried up over the divider-board are severed, so as not to interfere with the grain. It will be noticed that the finger 6 projects some distance outward, so as to catch the vines as they are carried between said finger 6 and the finger 7 to be severed by the cutter.

My attachment may be applied with slight alteration to any of the well-known binders on the market.

Various changes in the form, proportion, and the minor details of construction may be resorted to without departing from the principle or sacrificing any of the advantages of this invention.

Having thus described my invention, what I claim as new, and desire to secure by Letters Patent, is—

The herein-described vine-divider attachment for mowing-machines consisting of a crank-shaft, a sickle-bar, said crank-shaft being operatively connected to said sickle-bar, a vertically-disposed cutter-bar connected to said crank-shaft at one end, a divider-board provided with a slot, a guide through which said vertically-disposed bar operates, fingers formed on said guide, the upper finger being extended to form a guard, said cutter-bar and guide extending through the slot in the divider-board, cross-bars, and brackets for holding said guide in place within the slot in said divider-board, substantially as described.

In testimony whereof I have hereunto set my hand in presence of two subscribing witnesses.

HERSCHEL CLIMER.

Witnesses:
JNO. H. GREENBAUM,
WM. ENDERLIN.